U. ANDERSON.
ROPE DRIVEN SAWMILL SET WORKS.
APPLICATION FILED MAR. 23, 1908.

923,314.

Patented June 1, 1909.
6 SHEETS—SHEET 1.

Fig. 1.

Witnesses

Inventor:
Ulrich Anderson,
By Dodge and Sons,
Attorneys

U. ANDERSON.
ROPE DRIVEN SAWMILL SET WORKS.
APPLICATION FILED MAR. 23, 1908.

923,314.

Patented June 1, 1909.
6 SHEETS—SHEET 4.

Witnesses

Inventor:
Ulrich Anderson,
By Dodge and Sons, Attorneys

U. ANDERSON.
ROPE DRIVEN SAWMILL SET WORKS.
APPLICATION FILED MAR. 23, 1908.

923,314.

Patented June 1, 1909.
6 SHEETS—SHEET 5.

UNITED STATES PATENT OFFICE.

ULRICH ANDERSON, OF FOND DU LAC, WISCONSIN, ASSIGNOR TO GIDDINGS & LEWIS MANUFACTURING COMPANY, OF FOND DU LAC, WISCONSIN, A CORPORATION OF WISCONSIN.

ROPE-DRIVEN SAWMILL SET-WORKS.

No. 923,314.      Specification of Letters Patent.      Patented June 1, 1909.

Application filed March 23, 1908. Serial No. 422,863.

*To all whom it may concern:*

Be it known that I, ULRICH ANDERSON, a citizen of the United States, residing at Fond du Lac, in the county of Fond du Lac and State of Wisconsin, have invented certain new and useful Improvements in Rope-Driven Sawmill Set-Works, of which the following is a specification.

My present invention pertains to improvements in rope-driven saw-mill set-works, the construction and advantages of which will be hereinafter set forth, reference being had to the annexed drawings, wherein:

The main object of the invention is to provide a simple and efficient mechanism to effect an accurate setting of the knees at predetermined distances and to so construct the mechanism that the movement of the knees will be instantly stopped when they have been moved to the desired extent.

A further object of the invention is to provide means whereby the strain will be taken off of the parts when the setting lever reaches a predetermined point in its travel, and to provide a positive stop for the setting mechanism, which will be automatically thrown into operation by the setting lever while at the same time the lever is disconnected from the driving or actuating mechanism.

Another object of the invention is to provide means whereby the locking block or set-arresting member may be thrown out of operative relation, along with the clutch mechanism, which causes a forward movement of the knees, when it is desired to throw the receding mechanism for the knees into operation.

A still further object of the invention is to provide a mechanism wherein any slipping of the clutches employed in the machine will not affect in the least the accuracy of the setting movement.

With these and other objects in view, a description of the machine in its preferred form will be given.

In the drawings, 1 denotes the base, which is mounted upon the carriage 2. Said base carries a frame or housing preferably composed of two parts, 3 and 4, secured together in any suitable manner, and provided with extensions, as shown in the drawings, for the reception of the gears.

Figure 1:
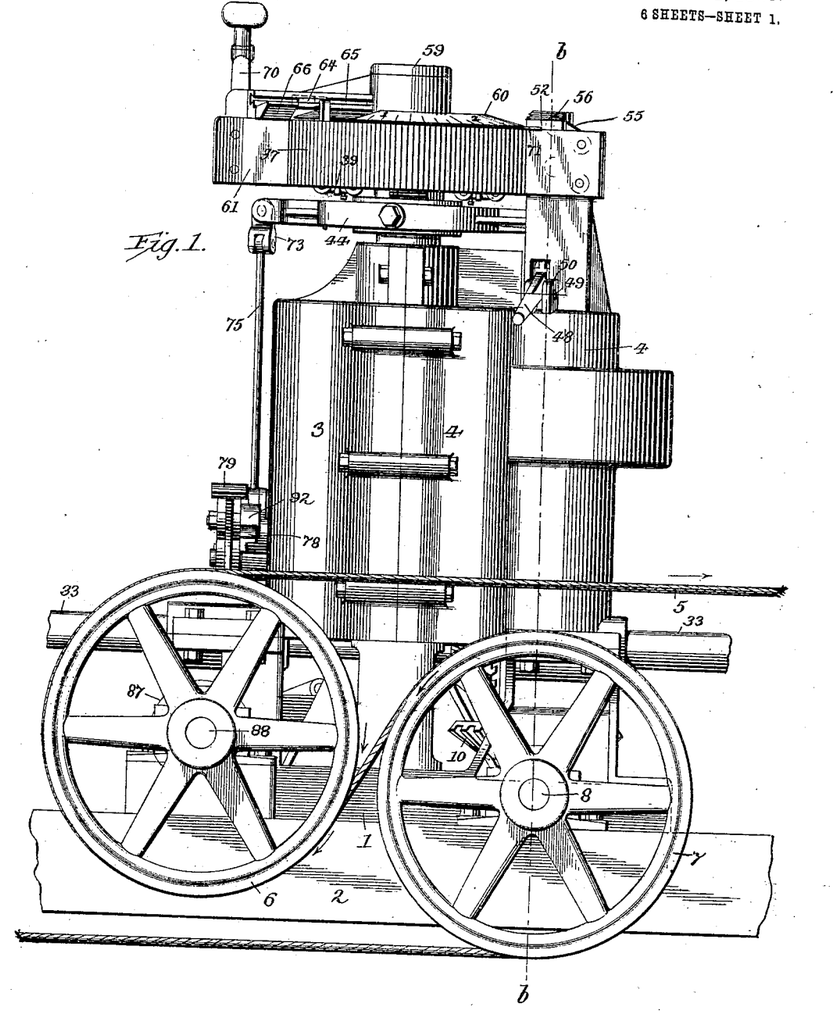
Figure 1 is an elevation of the apparatus, looking toward the saw.

The driving rope or cable 5 passes about the sheave-wheels 6 and 7, the latter being the driver, the sheaves rotating in the direction indicated by the arrows in Fig. 1.

Secured to the sheave 7 is a shaft 8, carrying at its inner end a bevel pinion 9 which meshes with a similar gear 10 mounted upon the lower end of a vertically-disposed shaft 11. The lower end of said shaft 11 passes through a bushing 12, mounted in a bearing 13 formed as a part of the frame or housing, while the upper end of the shaft passes through a sleeve 14, which finds its bearing in a box or projection 15. A second vertically-disposed shaft 16 has a bearing at its lower end in a brass sleeve 17, the latter in turn being secured in a box or bearing 18 formed as a portion of the frame or housing. The shaft, adjacent to its upper end, passes through a quill 19, the latter in turn finding its bearing in a brass sleeve or bushing 20 supported by a box or housing 21, formed as an upward extension of the frame or housing.

Figure 3:
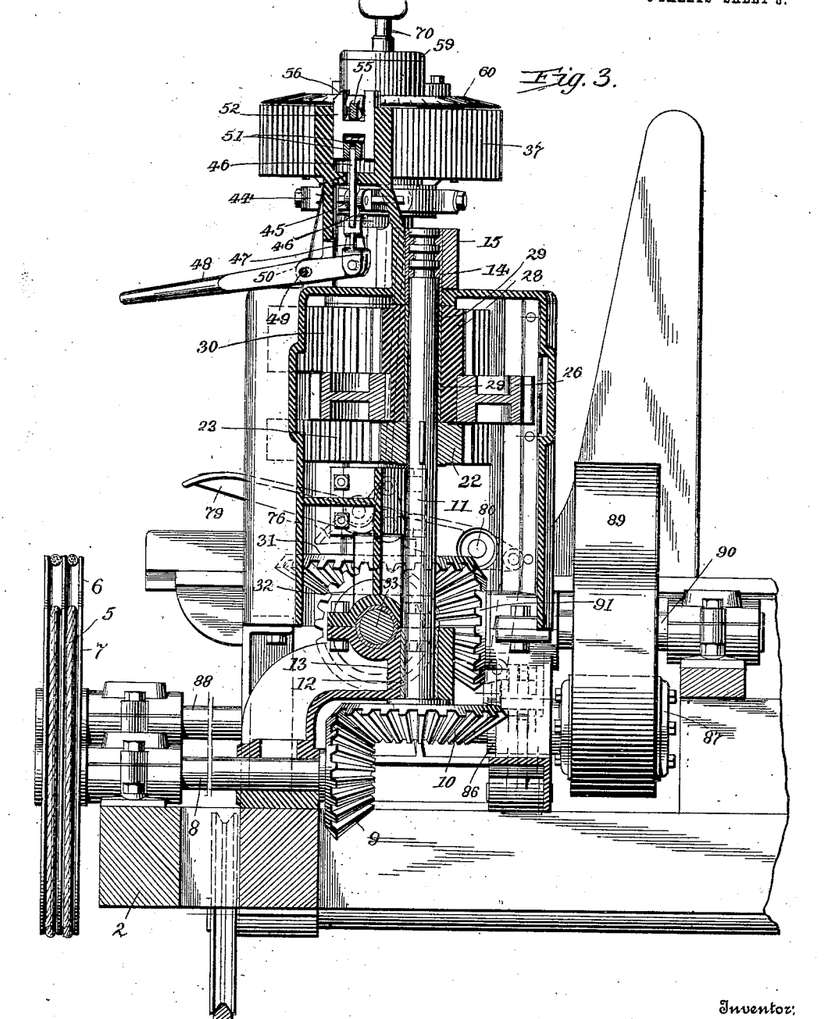
Fig. 3 a similar view, taken on the line $b$—$b$ of Fig. 1.

Secured to the shaft 11 is a pinion 22, Fig. 3, said pinion meshing with a gear 23 attached to the lower end of the projecting hub 24 of a pinion 25, the hub finding its bearing upon the upper end of the sleeve 17. Pinion 25 meshes with a gear 26 secured to the lower or extended end of the hub 27 of a pinion 28, the hub finding its bearing upon a sleeve 29 mounted upon the shaft 11. The pinion 28 in turn meshes with a gear 30 secured to the lower end of the quill 19. Thus it will be seen that so long as the rope or cable is in motion (as it is at all times in practice) a constant rotation will be imparted to the quill 19, and through the mechanism hereinafter to be described, a step-by-step movement will be given to the shaft 16. To the lower end of said shaft is secured a bevel gear 31, which meshes with a bevel pinion 32 secured upon a set shaft 33, which passes through bearings formed in the lower portion of the frame or housing.

Figures 9, 10, 11, 12, 13, 14:
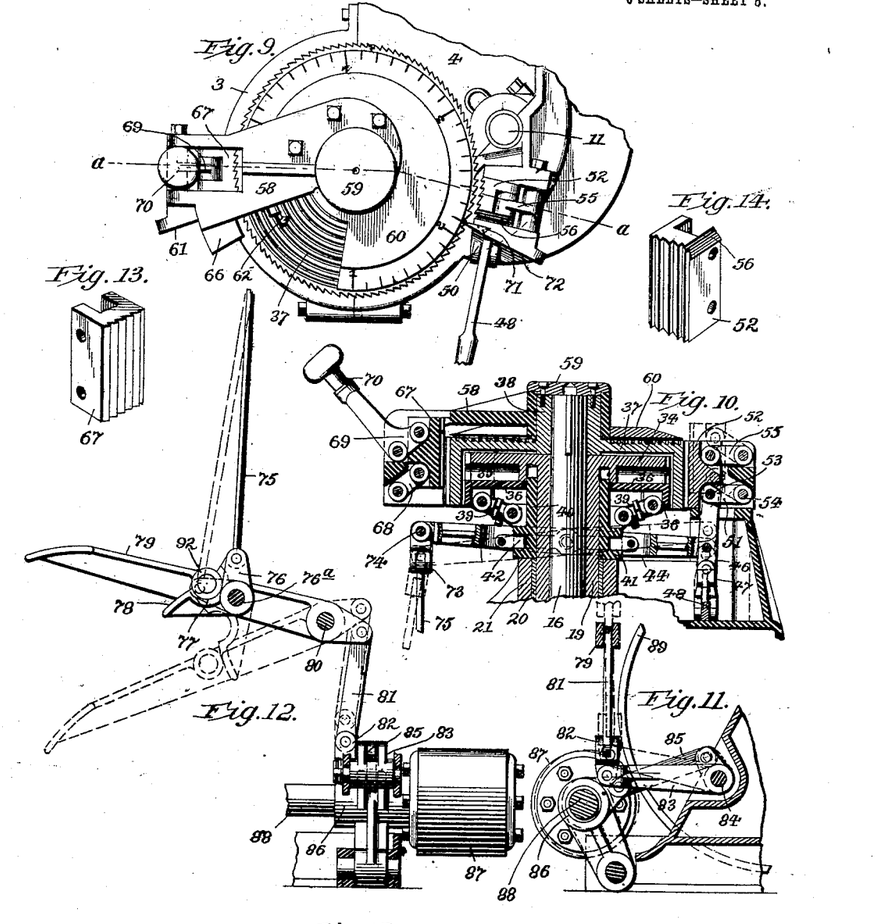
Fig. 9 a top plan view of the apparatus, certain portions of the lower part thereof being omitted, and the parts being shown in their initial setting position.
Fig. 10 a vertical sectional view of the upper portion of the setting mechanism.
Fig. 11 a detail sectional view, illustrating the driving mechanism employed to impart a receding movement to the knees.
Fig. 12 a similar view of the same parts.
Fig. 13 a perspective view of the locking block employed to lock the setting lever to the clutch-drum.
Fig. 14 a similar view of the block used to arrest the movement of the clutch-drum.
Figures 16, 17, 18, 19, 20, 21:
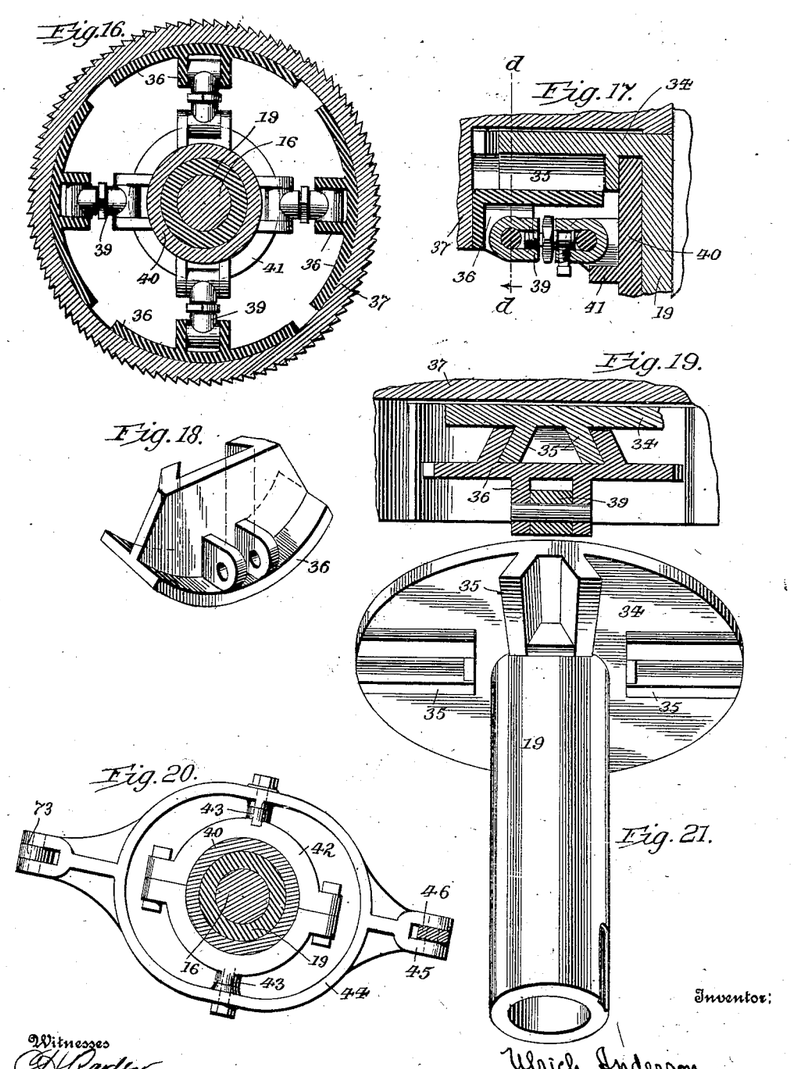
Fig. 16 a horizontal sectional view, taken on the line $c$—$c$ of Fig. 2, illustrating the clutch-drum and the clutch members or shoes which work in conjunction with the inner face thereof.
Fig. 17 an enlarged detail sectional view of one of the clutch-shoes and its operating link.
Fig. 18 a perspective view of one of the clutch-shoes as viewed from the under face thereof.
Fig. 19 a vertical sectional view, taken on the line $d$—$d$ of Fig. 17.
Fig. 20 a horizontal sectional view, taken on the line $e$—$e$ of Fig. 2, showing the yoke or frame which works in connection with the arresting mechanism for the clutch-drum.
Fig. 21 a perspective view, looking toward the under face, of the quill and clutch-supporting plate.

The upper end of the quill 19 has formed therewith a head or disk-like member 34, provided on its under face with four pairs of ways or guides 35 (see Fig. 21) and upon each pair of said ways is slidably mounted a shoe or clutch member 36, shown in detail in Fig. 18, the outer face of each shoe being formed upon a curve which when the shoes are moved outwardly contact with the inner face of a drum 37, the hub 38 of the drum being keyed or otherwise secured to the upper end of the shaft 16. Adjustable links 39, shown in detail in Fig. 16, connect each of the radially-movable shoes 36 with a vertically-movable sleeve 40, the latter being mounted upon quill 19. As the sleeve or collar is raised, the clutch-shoes will be moved outwardly into contact with the inner face of the clutch-drum, and will impart a rotary motion to said drum, inasmuch as the quill 19 and its head 34 are constantly rotated. A collar 41 is formed upon the lower end of the sleeve and a two-part ring 42 is seated in the collar, the collar, however, being free to rotate within the ring. Trunnions 43 extend outwardly from the collar, and a yoke-shaped frame 44 is swiveled upon said trunnions and passes about the various members, as best shown in Fig. 20. An eye 45 formed at one end of the yoke or frame, embraces a link 46 to which it is pivotally connected. The lower end of the link has pivoted thereto a short link 47, which in turn is pivotally connected to the inner end of a lever 48, fulcrumed upon a pin 49 which passes through lugs or ears 50, extending upwardly from the member 4 of the frame or housing, see Fig. 1. The upper end of the link 46 passes between the inner ends of a pair of links 51, said ends being pivotally secured to said link 46 and to a locking block 52, by a pin 53. The outer ends of the links are fulcrumed upon a pin or shaft 54. A link 55 is likewise connected to the locking block 52. Said block, as will be seen upon reference to Fig. 14, is provided upon its vertical face with a series of teeth which are complemental in shape to the teeth formed about the vertically-disposed face of the clutch-drum 37. The block is also provided on one side at the upper end with a beveled face 56, the purpose of which will presently appear.

Figures 6, 7, 8:
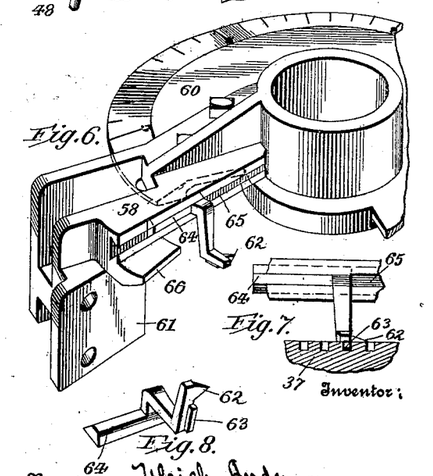
Fig. 6 a perspective view of the setting arm and its allied parts.
Fig. 7 a detail sectional view showing the indicator and a portion of the upper face of the drum in combination with which it works.
Fig. 8 a detail perspective view of the indicator, as viewed from the under face thereof.

As above stated, the clutch drum is provided with an upwardly-extending hub 38, and a set arm 58, shown in detail in Fig. 6, is swiveled or journaled upon the hub, the set arm being held in proper working relation with the other members by a cap plate 59 which is attached by bolts or screws to the upper end of the hub 38. Secured to the set arm and overlying the upper face of the clutch-drum is an index-plate or dial 60, graduated in inches and fractions thereof, the zero-point being coincident with the depending face 61 shown in Fig. 6.

Figure 5:
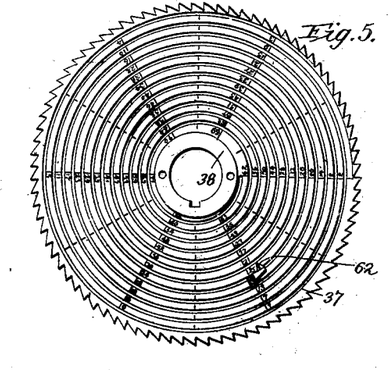
Fig. 5 a top plan view of the clutch-drum.

The upper face of the clutch drum is provided with a spiral groove, as shown in Fig. 5, which is graduated to indicate the total extent of movement of the knees toward the saw, and a pointer or indicator, shown in detail in Fig. 8, works in conjunction with the spiral. Said indicator is provided with a point or marker 62, with a downwardly-projecting lug 63 which normally rests in the spiral groove, and a dovetail arm or body portion 64, which works in a correspondingly shaped guideway 65 formed in the forward face of the set arm. Said arm is likewise provided with an outwardly projecting nose 66, the under face of which is beveled, as shown in Fig. 6, so that when the set arm is rotated said beveled portion will come in contact with the beveled face 56 of the locking block 52 and force the same downwardly so as to bring the teeth of the block into contact with the teeth of the clutch-drum and thus arrest the rotation of the drum.

By reason of the downward movement of the block 52, it will be readily appreciated that the yoke or frame 44 will likewise be moved downwardly through the link connections heretofore described, and as a consequence the clutch shoes 36 will be withdrawn from contact with the inner face of the clutch-drum and all further rotation of said drum will be prevented.

In order to lock the set arm to the drum and to cause the same to rotate therewith, and as a consequence impart a rotary motion to the shaft 16 and set-shaft 33, a locking block 67, shown in detail in Fig. 13, is employed. This block is provided with teeth complemental in shape to the bevel formed upon the outer face of the clutch-drum and is held in position upon the set arm by links 68 and 69, the latter being provided with an upwardly-extending handle 70, by which the block may be thrown into and out of locking relation with the clutch-drum.

In use the operator will release the block 67 and swing the set arm 58 around to such position as will give the knees the desired forward movement. In Fig. 9 the set to be effected is 2⅛ inches. A pointer or index-finger 71 extends outwardly in line with the face 72 of the frame or casting against which the face 61 contacts when the movement of the set arm is to be arrested.

Figure 2:
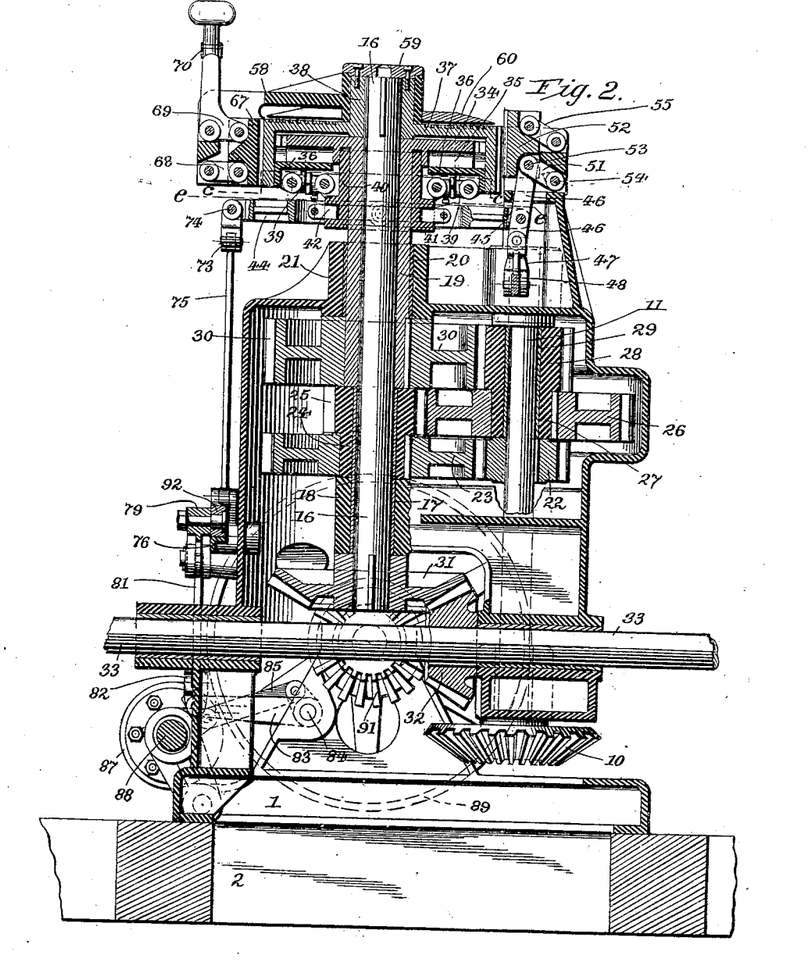
Fig. 2 a vertical sectional view, taken on the line $a$—$a$ of Fig. 9.
Figure 15:
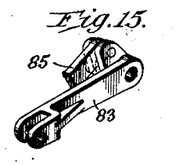
Fig. 15 a detail perspective view of one of the links or levers employed in connection with the receding mechanism.

A block 73 is pivotally connected at 74 to one end of the yoke or frame 44, and a link 75 is in turn pivotally connected to said block. The lower end of the link is attached to an elbow lever 76, see Fig. 12, fulcrumed upon a stud or bearing 76ᵃ extending outwardly from the frame of the machine, see Fig. 2. The lever 76 is provided with a round seat or recess 77 and with a curved face 78, to one side of said seat or recess. A foot lever 79 is fulcrumed upon a pin or shaft 80, extending outwardly from the frame of the machine, and to the short end of the lever is connected a link 81, which in turn is pivotally connected to a block 82, Fig. 11. Said block is pivoted to the outer end of an elbow-lever 83, Fig. 15, fulcrumed at 84. A link 85 is connected at one end to the short arm of said elbow-lever and at its opposite end to a swinging box 86, which carries a friction driving pulley 87 mounted upon a shaft 88, to which is secured the sheave 6. A roller 92 is mounted upon the lever 79, and under normal conditions rests within the curved seat or recess 77, see full lines in Fig. 12. The driving pulley 87 is designed to coact with a driving wheel 89, mounted upon a shaft 90 (see Fig. 3), carrying at its inner end a bevel pinion 91, which intermeshes with the gear 31 secured to the lower end of shaft 16. These parts are employed for receding the knees, and the pulley 87 normally stands out of contact with the wheel 89.

Figure 4:
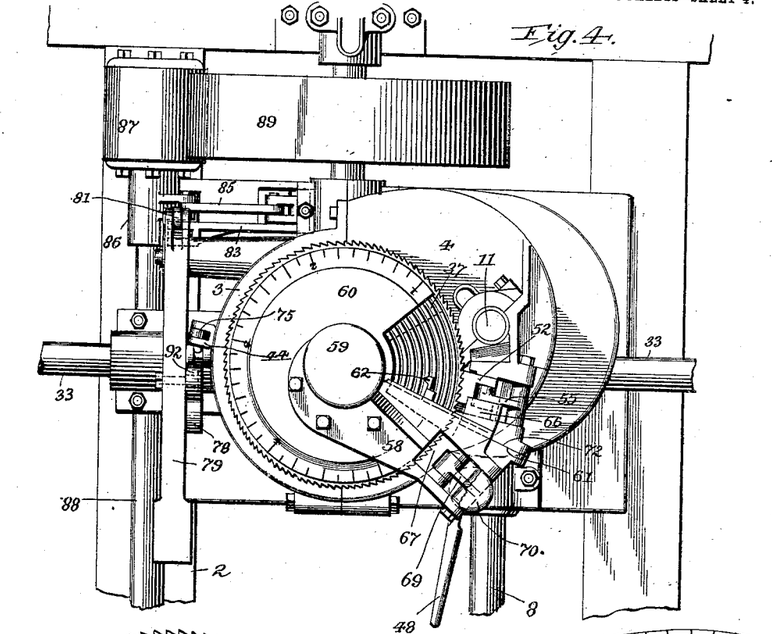
Fig. 4 a top plan view of the apparatus, the setting arm being shown as moved around to a point where the motion of the set shaft will be arrested.

The operation of the apparatus is as follows: Constant motion being imparted to the rope 5, the sheaves 6 and 7 will be rotated in the direction indicated by the arrow in Fig. 1. With the set arm in the position shown in Fig. 9, and it being desired to move the knees to the saw, say, 2⅛ inches, the operator will, through the manipulation of the handle 70, carry the set arm 58 around to the position shown in Fig. 9, when the mark for 2⅛ inches upon the dial 60 will come opposite the pointer 71. The operator will then throw the handle 70 to the upright position shown in Fig. 2, whereby the block 67 will be moved inwardly and into contact with the teeth upon the clutch drum. The drum will remain stationary until such time as the shoes are moved outwardly into contact with the inner face of the drum, and this is effected through the manipulation of the handle or lever 48. A downward movement of the outer end of the handle will elevate the link 46 and consequently raise the block 52 out of locking contact with the teeth of the clutch-drum, at the same time lifting the yoke or frame 44 which swings about the pivotal connection 74 of the block 73. As a consequence, the sleeve 40 will be elevated and the links brought to a horizontal position, with the shoes or clutch-members 36 in locking engagement with the inner face of the clutch-drum. The motion of the constantly-rotating quill will thus be imparted to the clutch-drum (by reason of the fact that the clutch shoes or members are carried by the head of the quill) and the clutch-drum, with the set arm which has been locked thereto, will rotate until such time as the nose or projection 66, carried by the arm, rides over the bevel face 56 of the locking-block 52, whereupon the block will be depressed and the teeth thereof will come into contact with the teeth of the clutch-drum. At the same time, through the downward movement of the link 46, the yoke or frame 44 will be depressed and the clutch shoes will be drawn out of working relation with the inner face of the drum. Thus it will be seen that the parts cannot overthrow, and that immediately the setting arm reaches its limit of movement its motion is automatically arrested, and this without shock or jar to the parts. Again, the movement will not be arrested (notwithstanding any slipping of the clutch members) until the set arm has traveled the full distance and the face 61 comes into contact with the face 72, at which time the locking block 52 will have been fully lowered and the shoes 36 withdrawn from working contact with the inner face of the clutch-drum. When the parts come to this position, which is shown in Fig. 4, the operator throws the handle 70 downwardly, thereby releasing the block 67 from contact with the clutch-drum, and swings the set arm around to position to give the next required set. In so doing, the indicator will be moved in the spiral slot formed in the upper face of the clutch-drum, and inasmuch as the clutch-drum remains stationary at this time the indicator will, of course, be moved outwardly or away from the center of the drum and show the thickness of the remaining stock which is to be cut.

When it is desired to recede the knees it is, of course, essential that both the locking blocks 52 and 67 be withdrawn from contact with the clutch-drum, and this is effected by the operation of the foot lever 79 and the parts which work in conjunction therewith. A downward movement of the foot lever from the position shown in full lines in Fig. 12 to the dotted line position in said figure and in Figs. 10 and 11 will first, through the roller 92 and the elbow-lever 76, draw the link 75 downward and as a consequence swing the yoke or frame 44 until the collar 41 comes in contact with the upper end of the box or housing 21, see Fig. 10, whereupon the further downward movement of the lever will cause the yoke or frame 44 to rock so as to carry the link 46 upwardly and throw the block 52 out of locking relation with the clutch-drum. As the roller 92 passes out of the seat or recess 77 it will come in contact with the curved face 78 of the elbow-lever 76, which face is at such time concentric with the fulcrum 80 of the lever 79, and as the roller is moved downwardly to a slight extent along said face 78 the swinging box 86 will be drawn upward so as to carry the friction driving pulley 87 into contact with the wheel or drum 89, whereupon a reverse motion of the parts will be given through the shaft 88, the sheave 6 and the connections heretofore described. This will cause a reverse movement of the set shaft 33 and the shaft 16 through the bevel pinion 91, bevel gear 31 and bevel pinion 32. As a consequence, the indicator which works in the spiral slot will be moved inwardly to the full extent and the knees at the same time will be receded from the saw. After the knees have been receded the lever 79 is brought back to the position shown in full lines, Fig. 12, whereupon the parts will assume the positions shown in Fig. 2, ready to be again operated to cause a step-by-step advancement of the knees in the manner above set forth.

Having thus described my invention, what I claim is:

1. In a saw-mill set-works, the combination of an actuating member; a set-shaft; an adjustable set arm; means for connecting the set-shaft to the actuating member; and means for automatically releasing the connecting means from the actuating member and simultaneously and positively arresting the movement of the set-arm and the set-shaft when the arm has moved a predetermined distance.

2. In a saw-mill set-works, the combination of an actuating member; a set-shaft; means for connecting the shaft to the actuating member; a set arm adjustable about said actuating member; a fixed stop; and means controlled by the set arm for automatically releasing the connecting means when the arm has traveled a predetermined distance and comes into contact with the stop.

3. In a saw-mill set-works, the combination of an actuating member; a set shaft; a clutch for connecting the shaft to the actuating member; a set arm adjustable about said actuating member; a fixed stop; and means actuated by the set arm for automatically releasing the clutch when the arm has moved a predetermined distance and comes into contact with the stop.

4. In a saw-mill set-works, the combination of an actuating member; a set shaft; means connecting the shaft and said member; a locking block for arresting the setting movement of the set shaft, said block being moved out of operative relation by the connecting means as the latter is brought into operative relation; and a set arm, said arm acting on the block to throw it into locking position as the arm reaches the limit of its predetermined movement.

5. In a saw-mill set-works, the combination of an actuating member; a set shaft; a clutch for connecting said member and shaft; a locking block for arresting the setting movement of the shaft; connections between the block and clutch for moving one into working position as the other is moved out of working position; and a set arm, said arm serving to move the block into locking position and to release the clutch when the arm has reached its limit of travel.

6. In a saw-mill set-works, the combination of an actuating member for the set-shaft; a clutch for connecting the member to the shaft; a locking block for arresting the setting movement of the shaft; and connections between said block and clutch, whereby under normal working conditions when one is in operative relation the other is thrown out.

7. In a saw-mill set-works, the combination of a rotary actuating member; a set shaft; a clutch-drum operatively connected to the shaft; a clutch for connecting the drum to the actuating member; a locking block serving to arrest the rotation of the drum and consequently the rotation of the set shaft; connections between the block and the clutch; and a set arm working in conjunction with the clutch-drum and serving, as it reaches its predetermined limit of movement, to throw the locking block into operative relation with the drum and to release the clutch.

8. In a saw-mill set-works, the combination of a rotary actuating member; a set shaft; a clutch-drum in operative relation with said set shaft; a clutch for connecting the actuating member to the clutch drum; a locking block; connections between the clutch and the locking block, whereby when one is moved into operative relation with the drum the other is moved out of such relation; a set arm; means for locking the arm to the drum; and means carried by the arm for forcing the locking block into operative position with relation to the drum and withdrawing the clutch from connection therewith.

9. In a saw-mill set works, the combination of a rotary actuating member; a set shaft; a clutch drum in operative relation with the set shaft and normally moving therewith; a clutch carried by the rotary actuating member; means for throwing said clutch into and out of operative relation with the drum; a locking block for arresting the movement of the drum; connections between said block and the clutch-actuating means; a set arm; a locking block connected to said arm and adapted to be moved into operative relation with the drum; and means carried by said set arm and serving to throw the first-mentioned locking block into operative relation with the drum and to release the clutch.

10. In a saw-mill set-works, the combination of a vertically-disposed shaft; a second vertically-disposed shaft; means for imparting a constant rotary motion to said first shaft; a quill or sleeve mounted upon the second shaft; a set shaft; gearing interposed between the second shaft and the set shaft; means for imparting motion from the first shaft to the quill; a head or disk carried by the quill; a series of radially-movable clutch-shoes mounted upon said head; a clutch-drum; a locking block arranged to one side of the drum; a yoke; connections between said yoke and the shoes for actuating the latter; connections between the block and said yoke; a lever for moving said yoke and throwing the clutch into operative relation with the drum and the locking block out of operation therewith, or vice versa; a set lever; means for locking the lever to the drum; and means carried by the lever for depressing the locking-block and, through the connections described, releasing the clutch from its operative relation with the drum, whereby the movement of the set shaft will be arrested after it has been moved a predetermined distance.

11. In a saw-mill set-works, the combination of a rotary actuating member; a set shaft; a clutch drum rotating with said shaft; a clutch for connecting the drum to the actuating member; a set arm; means for locking the arm to the drum; means for releasing the clutch when the arm has moved a predetermined distance; and an indicator carried by the set arm, said indicator having a projection which extends downwardly into a spiral slot formed in the upper face of the drum, said face being graduated so as to indicate the distance the knees have been moved toward the saw.

12. In a saw-mill set-works, the combination of a rotary actuating member; a set shaft; a rotary member connected to the set shaft; means for connecting said rotary member to the actuating member; a set arm; means for releasing the connection between the actuating member and the rotating member when the arm has moved a predetermined distance; an indicator carried by the set arm; and a projection formed upon the indicator, said projection extending into a spiral slot formed in the face of the rotary member and indicating by its position the distance which the knees have been moved.

13. In a saw-mill set-works, the combination of a rotary actuating member; a set shaft; a clutch-drum normally in operative relation with said shaft and movable therewith; a clutch; means for throwing the clutch into operative relation with the clutch-drum; a locking block serving to arrest the movement of the clutch-drum; a set arm or lever; means for connecting the lever to the drum; mechanism for imparting a reverse rotation to the set shaft and thereby receding the knees; and means for bringing said mechanism into operative position, said means being connected to the locking block to throw it out of operative relation with the clutch drum as the means is positioned to bring the mechanism into operation.

14. In a saw-mill set-works, the combination of a rotary actuating member; a set-shaft; a clutch-drum connected to the shaft and rotating therewith; a locking-block for arresting the movement of the drum; a clutch connecting the drum to the actuating member and thereby imparting a setting movement to the set-shaft; mechanism independent of the clutch for imparting a resetting movement to the set-shaft; and means for bringing said mechanism into operative position and simultaneously withdrawing the locking-block from locking relation with the drum.

15. In a saw-mill set-works, the combination of a rotary actuating member; a set shaft; a clutch-drum connected to and rotating with said set shaft; a clutch for connecting said drum to the actuating member; a locking block serving normally to arrest the movement of the clutch-drum as the clutch is moved out of operative relation therewith; mechanism for imparting a receding movement to the set shaft; and means for throwing said mechanism into operative position and simultaneously throwing the locking block out of contact with the clutch-drum and holding the clutch out of operative relation therewith, whereby the clutch-drum is free to rotate in a reverse direction.

16. In a saw-mill set-works, the combination of a rotary actuating member; a set shaft; a clutch-drum rotating with the set shaft at all times; a clutch for connecting the actuating member with the drum; means for actuating said clutch; a locking block; connections between said locking block and the clutch-actuating means; mechanism for imparting a receding movement to the set shaft; a lever for positioning said mechanism; and connections between said lever and the clutch-operating means, whereby the clutch will be held out of operative relation with the drum, and the locking block will likewise be thrown out of operative position, thereby freeing the clutch-drum and permitting the same to rotate with the set shaft during its receding movement.

17. In a saw-mill set-works, the combination of a rotary actuating member; a set shaft; a clutch-drum rotating with the set shaft; a clutch connecting the rotary actuating member with the clutch-drum; a locking block serving to arrest the movement of the drum when the clutch is out of operative relation therewith; a yoke; connections between said yoke and the locking block; connections between the yoke and the clutch; mechanism for imparting a receding movement to the set shaft; a foot-lever for positioning said mechanism; a rod or link connected to the yoke; an elbow-lever fulcrumed upon a fixed portion of the machine, said lever being connected at one end to the lower end of the rod or link; and a roller carried by the foot-lever and normally resting in a seat or recess formed in the elbow-lever, said roller, when the foot-lever is moved downward, passing out of the seat or recess and onto a curved face formed upon the elbow-lever, whereby the yoke will be drawn downwardly and rocked, thereby withholding the clutch from operation and elevating the locking block so as to throw it out of operative relation with the clutch-drum.

18. In a saw-mill set-works, the combination of an actuating member; a set-shaft; means for connecting the shaft to the actuating member; an adjustable set-arm; means for causing said arm to move in consonance with the set-shaft; and means for automatically releasing the connecting means between the actuating member and the set-shaft and positively arresting the movement of the set-arm and set-shaft when the arm has moved a predetermined distance.

In testimony whereof I have signed my name to this specification in the presence of two subscribing witnesses.

ULRICH ANDERSON.

Witnesses:
WILLIAM McDERMOTT,
OTTO P. KOENTOPP.